United States Patent
Camhi

(10) Patent No.: US 8,868,264 B2
(45) Date of Patent: Oct. 21, 2014

(54) AIRCRAFT POWER PLANT, AN AIRCRAFT, AND A METHOD OF PILOTING SAID AIRCRAFT

(75) Inventor: Emmanuel Camhi, Fuveau (FR)

(73) Assignee: Airbus Helicopters, Marignane Cedex (FR)

( * ) Notice: Subject to any disclaimer, the term of this patent is extended or adjusted under 35 U.S.C. 154(b) by 342 days.

(21) Appl. No.: 13/274,843

(22) Filed: Oct. 17, 2011

(65) Prior Publication Data

US 2012/0109426 A1    May 3, 2012

(30) Foreign Application Priority Data

Oct. 29, 2010    (FR) ...................................... 10 04274

(51) Int. Cl.
| | | |
|---|---|---|
| *G06F 19/00* | (2011.01) | |
| *F02C 9/42* | (2006.01) | |
| *F02C 9/46* | (2006.01) | |
| *F02C 9/28* | (2006.01) | |
| *B64D 31/00* | (2006.01) | |

(52) U.S. Cl.
CPC .............. *F02C 9/28* (2013.01); *F05D 2270/095* (2013.01); *F02C 9/42* (2013.01); *Y02T 50/671* (2013.01); *F05D 2270/093* (2013.01); *F02C 9/46* (2013.01); *F05D 2220/329* (2013.01); *B64D 31/00* (2013.01)
USPC .......................................................... 701/15

(58) Field of Classification Search
CPC ................ F02C 9/00; F02C 9/28; F02C 7/00; G05D 1/00; G05D 1/08
USPC ...................... 701/1, 3, 15, 16, 100
See application file for complete search history.

(56) References Cited

U.S. PATENT DOCUMENTS

| | | | |
|---|---|---|---|
| 5,873,546 A * | 2/1999 | Evans et al. ................. | 244/17.13 |
| 7,532,970 B1 * | 5/2009 | Lardillon ...................... | 701/100 |
| 7,668,639 B2 | 2/2010 | Francois | |
| 2008/0097703 A1 | 4/2008 | Francois | |
| 2009/0125205 A1 | 5/2009 | Lardillon | |

FOREIGN PATENT DOCUMENTS

| | | |
|---|---|---|
| EP | 1281846 A2 | 2/2003 |
| FR | 2602270 A1 | 2/1988 |
| FR | 2878288 A1 | 5/2006 |
| FR | 2888287 A1 | 1/2007 |
| FR | 2888288 A3 | 1/2007 |
| WO | 2010143051 A2 | 12/2010 |

OTHER PUBLICATIONS

Search Report and Written Opinion; Application No. FR 1004274; dated Jun. 15, 2011.

* cited by examiner

*Primary Examiner* — Kim T Nguyen
(74) *Attorney, Agent, or Firm* — Brooks Kushman P.C.

(57) ABSTRACT

A power plant (2) having at least one engine (3, 4) and control means (5) for controlling said engine (3, 4). The control means (5) include a memory (6), said memory (6) containing information for operating said engine (3, 4) in accordance with at least two distinct utilization envelopes during a maximum number of flying hours, the two envelopes comprising an envelope enabling takeoff from a platform and another envelope enabling takeoff from takeoff zones not including platforms, each utilization envelope comprising at least two distinct utilization ratings each defined by a developed power and by a utilization duration for said developed power.

18 Claims, 2 Drawing Sheets

AIRCRAFT POWER PLANT, AN AIRCRAFT, AND A METHOD OF PILOTING SAID AIRCRAFT

CROSS REFERENCE TO RELATED APPLICATIONS

This application claims priority to FR 10 04274 filed on Oct. 29, 2010, the disclosure of which is incorporated in its entirety by reference herein.

BACKGROUND OF THE INVENTION (1) Field of the Invention

The present invention relates to a power plant for an aircraft, in particular a rotorcraft, and to a method of piloting said aircraft.

(2) Description of Related Art

Most presently-built rotorcraft are fitted with one or two free-turbine engines. Power is then taken from a low-pressure turbine that is known as a "free turbine", which turbine is mechanically independent from the assembly comprising the compressor and the high pressure stage, including in particular a high pressure turbine, of the turbine engine. The free turbine of a turbine engine generally rotates at a speed lying in the range 20,000 revolutions per minute (rpm) to 50,000 rpm, so a speed-reducing gearbox is needed to connect it to the main rotor of the rotorcraft that has a speed of rotation lying substantially in the range 200 rpm to 400 rpm: this is the main power transmission gearbox (MGB).

The temperature limitations of a turbine engine and the torque limitations of an main power transmission gearbox serve to define a utilization envelope for the turbine engine covering two normal utilization ratings for a turbine engine arranged on a single-engined or twin-engined rotorcraft:

a takeoff rating corresponding to a level of torque for the main power transmission gearbox and a temperature rise for the turbine engine that are acceptable over a limited length of time without significant degradation, this takeoff rating being defined by a maximum takeoff power (PMD) and by a utilization duration for said maximum takeoff power PMD, which is generally of the order of 5 minutes; and maximum continuous rating, which rating is defined by a maximum continuous power (MCP) corresponding to about 90% of the maximum takeoff power PMD, and by a utilization duration for said maximum continuous power that is generally unlimited.

On a twin-engined rotorcraft, the performance envelope also covers contingency power ratings during which extra power is used, but only when one of the two turbine engines breaks down:

a first contingency rating, defined both by a first supercontingency power PSU that is often equal to about 112% to 120% of the maximum takeoff power (PMD) and by a utilization duration for said first supercontingency power PSU that is generally of the order of at most thirty consecutive seconds, which first supercontingency power is conventionally usable up to three times during a flight;

a second contingency rating, the second contingency rating being defined both by a maximum contingency power PMU equal to about 105% to 110% of the maximum takeoff power (PMD) and by a utilization duration for said maximum contingency power PMU of the order of at most two consecutive minutes; and a third contingency rating, the third contingency rating being defined both by an intermediate contingency power PIU that is substantially equal to the maximum takeoff power (PMD) and by a utilization duration of said intermediate contingency power PIU that is unlimited for the remainder of the flight after the breakdown of the turbine engine.

Thus, the engine manufacturer defines a utilization envelope for the turbine engine, said utilization envelope comprising a plurality of ratings, each rating associating a power developed by the turbine engine with a utilization duration for said power.

Furthermore, temperature and mechanical constraints and above all the phenomenon of turbine blade creep can lead to the turbine engine being degraded to a greater or lesser extent depending on the rating. In order to guarantee safety in flight and that performance will be obtained, it is therefore essential to determine the maximum amount of damage that is acceptable for a turbine engine.

Thereafter, the overall utilization potential of the turbine engine is evaluated. Concretely, this amounts to defining a maximum number of flying hours, known to the person skilled in the art as time between overhauls (TBO), that the turbine engine is capable of carrying out as measured from its most recent overhaul or from its first use, depending on which situation is applicable. Once that maximum number of flying hours has been reached, the turbine engine is removed and then overhauled.

Below and for convenience, the term "most recent overhaul of the turbine engine" is used to designate as appropriate, either the first use of the turbine engine or else the most recent occasion on which it was, in fact, overhauled.

Thus, the engine manufacturer defines a utilization envelope for the turbine engine that is associated with some maximum number of flying hours, said utilization envelope corresponding to a plurality of ratings, each rating associating a level of power developed by the turbine engine with a utilization duration for that power level. Furthermore, the manufacturer associates a maximum number of flying hours with the utilization envelope.

It should be recalled that a turbine engine is usually provided with control means, and that information relating to the ratings of an envelope is stored in the control means. Under such circumstances, when the pilot of an aircraft requires a given rating to be used, the control means control the turbine engine, and in particular its fuel metering unit, so that the turbine engine responds to the given order.

Furthermore, in order for a rotorcraft to obtain authorization to fly in a given country, it will be understood that the utilization envelope and the maximum number of flying hours for the turbine engine(s) of the rotorcraft need to be certified by the official services in the country under consideration for a specified utilization spectrum. Such authorization is thus obtained only after thorough certification testing, which is very expensive.

Since such thorough certification testing of a turbine engine is performed in order to justify a utilization envelope associated with some maximum number of flying hours, it is not possible to use the turbine engine with a performance envelope that is different from the performance envelope that was initially authorized, without performing thorough certification testing, which, once more is very expensive.

It can be understood that a given turbine engine may correspond to a type of mission. Nevertheless, the turbine engine runs the risk of not having an optimized staging of the ratings of its utilization envelope for a mission of some other type.

For example, a life-saving mission involving winching requires a turbine engine to operate in accordance with a utilization envelope that is different from a utilization envelope that has been optimized for a mere ferrying mission.

Under such circumstances, a utilization envelope allows one type of mission to be carried out but, a priori, does not allow some other type of mission to be carried out, or at least does not allow it to be carried out in optimized manner.

Furthermore, regulations, and for example the JAR-OPS3 European Operational Regulations, require manufacturers to ensure aircraft safety, in particular during stages of takeoff and landing.

Requirements vary depending on the takeoff area. Existing regulations define various types of takeoff area such as a heliport, a helispot, and a platform. For example, the JAR-OPS3 regulations state that a platform is a takeoff area situated at least three meters above the surrounding surface, the platform being referred to as an "elevated" heliport.

Once a takeoff area has had a type allocated thereto, the surroundings of the takeoff area are also defined, which surroundings may constitute an environment that is hostile and not obstacle-free, for example.

Finally, the regulations define in particular the type of landing that is possible after one of the engines of a twin-engined rotorcraft has broken down. For example, the JAR-OPS3 regulations specify three so-called "performance" classes 1, 2, and 3.

Under such circumstances, the manufacturer must set up takeoff and landing procedures that make it possible to ensure that the aircraft is safe in compliance with the criteria required by the regulations, which procedures may vary from one aircraft to another, and as a function of the class associated with a takeoff area.

The manufacturer of an aircraft thus draws up such takeoff and landing procedures as a function of the capabilities of the aircraft.

It can be understood that a power plant having an unchanging utilization envelope gives the manufacturer little room to maneuver when drawing up optimized landing and takeoff procedures.

However, by optimizing landing and takeoff procedures, it is possible to maximize the maximum weight that the rotorcraft can transport.

As a result, an aircraft having a power plant that operates in accordance with an unchanging utilization envelope puts a limit on:

the missions that can be performed by that aircraft; and the procedures that can be selected for landing and takeoff, and consequently the maximum weight that can be transported.

Conventionally, when developing an aircraft, a manufacturer selects a power plant having a utilization envelope suitable for satisfying the usual requirements of most of that manufacturer's clients, and then establishes the best takeoff and landing procedures made possible by using that power plant.

It is also possible to use a power plant that is overdimensioned in order to be capable of carrying out multiple missions. Nevertheless, such a power plant is both expensive and also penalizing from a weight point of view.

According to document FR 2 878 288, it is possible to modify a utilization envelope of a turbine engine by modifying the maximum number of flying hours.

According to document FR 2 888 288, starting from an initial utilization envelope, an alternative envelope is drawn up. The conversion from the initial utilization envelope to the alternative envelope is performed without modifying the number of maximum flying hours for the turbine engine, but by lowering the value of an initial envelope parameter. For example, the power of a given rating is increased, but the utilization duration of that rating is decreased.

The state of the art also includes documents EP 1 281 846 and FR 2 602 270 that mention the possibility of reevaluating the limits of an engine in an emergency.

SUMMARY OF THE INVENTION

Under such conditions, an object of the present invention is to provide an aircraft power plant, an aircraft, and a method of piloting said aircraft that enable a given aircraft to be used in accordance with multiple utilization spectra without modifying the power plant of the aircraft.

According to the invention, a power plant is provided with at least one engine and with control means for controlling said engine. More particularly, the power plant may be a power plant of a rotorcraft and it may be provided with at least one turbine engine.

Furthermore, the control means include a memory, said memory containing information to enable the engine to be operated in accordance with at least two distinct utilization envelopes during a maximum number of flying hours, as opposed to in accordance with a single envelope, each utilization envelope comprising at least two utilization ratings, each defined by both a power that is developed and by a utilization duration for said developed power.

For example, if the control means act on the limits of the engine and/or the fuel metering unit of the engine, then said memory contains the limits and/or the position of the fuel metering unit that are associated with each rating of each envelope. Reference may be made to the literature to obtain additional information relating to the operation of an engine and of its control means.

Thus, the power plant may operate in accordance with a plurality of utilization envelopes, all of which are associated with the same maximum number of flying hours. Depending on requirements, the pilot selects the envelope that is best adapted to the mission.

For example, it is possible to provide one envelope for ferrying missions and another envelope for winching missions.

In another context, it is possible to envisage certifying the power plant for at least one envelope that enables the procedure for taking off from a platform to be optimized, and at least one other envelope that is adapted to optimize the procedure for taking off from a takeoff zone that is distinct from a platform.

The term "takeoff zone" is used to designate any takeoff area other than a platform.

A conventional aircraft includes a power plant that is either overdimensioned, or else that is adapted to only one kind of takeoff that needs to be carried out.

Conversely, the invention makes it possible to use a power plant having reasonable dimensions and that is certified for at least two envelopes enabling takeoff to be performed optimally both from a platform and from a takeoff zone not including a platform. The rotorcraft manufacturer is thus no longer limited to using only one envelope.

For example, compared with a conventional envelope for a twin-engined rotorcraft having in particular first, second, and third contingency ratings:

it is possible to define one envelope that is optimized from taking off from a platform by increasing the supercontingency power and reducing the maximum contingency power compared with a conventional envelope in order to maintain a constant maximum number of flying hours; and it is possible to define another envelope that is optimized for taking off from a takeoff zone other than a platform by increasing the maximum contingency power and reducing the supercontingency power relative to a conventional envelope in order to maintain a constant maximum number of flying hours.

There is no need to replace the engine or to reprogram the control means between two missions.

Envelopes relating to landing procedures can also be envisaged.

Furthermore, the invention may include one or more of the following characteristics.

Thus, the power plant may include pilot-operable selector means, the selector means being connected to the control means to enable the pilot to select the utilization envelope in accordance with which the engine is to operate.

The pilot then operates selector means, e.g. prior to starting the engines of the power plant, in order to cause the engines to operate in accordance with the envelope that is most appropriate, given the mission that is to be carried out.

Furthermore, the power plant may include safety means for ensuring that an envelope is deliberately selected before beginning a flight.

By way of example, the safety means may comprise a stop position for the selector means. For example, the selector means may have a first position enabling a first utilization envelope to be taken, a second position enabling a second utilization envelope to be taken, and a stop position that is not associated with any utilization envelope.

In order to stop the power plant, it is then appropriate to place the selector means on the stop position. Under such circumstances, in order to start the power plant, the pilot must then necessarily select a utilization envelope.

Furthermore, the power plant may include display means displaying either the utilization envelope, or the utilization rating implemented by the power plant, or the utilization envelope and the utilization rating of said utilization envelope that are being implemented by the power plant.

In another aspect, if the power plant has two engines, each utilization envelope including at least one contingency rating suitable for use when one of the engines breaks down, with a contingency rating of one envelope differing from a contingency rating of another envelope.

Thus, it is possible in particular to make provision for takeoff procedures that differ significantly depending on the configuration of the takeoff area.

For a power plant comprising two aircraft engines, the selector means may for example include at least two positions each associated with a respective utilization envelope, the two positions being for selection from a list including:

a first position for taking off from a platform situated at a first height with a maximum weight that can be transported by the aircraft and requiring the engines to operate in accordance with a first utilization envelope;

a second position for taking off from a platform situated at a second height, with a maximum weight transportable by the aircraft and requiring the engines to operate in accordance with a second utilization envelope;

a third position for taking off from a takeoff zone having a first obstacle-free area and distinct from a platform, with a maximum weight transportable by the aircraft and requiring the engines to operate in accordance with a third utilization envelope; and a fourth position for taking off from a takeoff zone having a second obstacle-free area and distinct from a platform, with a maximum weight transportable by the aircraft and requiring the engines to operate in accordance with a fourth utilization envelope.

For example, each envelope having a first contingency rating during which an engine may develop a supercontingency power for a first given length of time, a second contingency rating during which an engine may develop a maximum contingency power during a second given length of time, and a third contingency rating during which an engine may develop an intermediate contingency power continuously, these contingency ratings may be implemented as follows in the event of one engine being inoperative:

for the first envelope, the supercontingency power reaches a high supercontingency value, e.g. about 1100 kilowatts (kW), the maximum contingency power reaches a limited maximum contingency value, e.g. of the order of 600 kW, while the intermediate contingency power is equal to a limited intermediate contingency value, e.g. of the order of 450 kW;

for the second utilization envelope, the supercontingency power reaches a medium supercontingency value, e.g. of the order of 1000 kW, the maximum contingency power reaches a high maximum contingency value, e.g. of the order of 700 kW, while the intermediate contingency power is equal to a first medium intermediate contingency value, e.g. of the order of 500 kW;

for the third utilization envelope, the supercontingency power reaches a second medium supercontingency value, e.g. of the order of 900 kW, the maximum contingency power reaches a second high maximum contingency value, e.g. of the order of 650 kW, while the intermediate contingency power is equal to a high intermediate contingency value, e.g. of the order of 600 kW; and for a fourth utilization envelope, the supercontingency power reaches a limited supercontingency value, e.g. of the order of 800 kW, the maximum contingency power reaches a high maximum contingency value, e.g. of the order of 800 kW, while the intermediate contingency power is equal to a medium intermediate value, e.g. of the order of 500 kW.

These utilization envelopes then enable a broader utilization spectrum for the aircraft to be covered, with the weight that the aircraft can transport being optimized.

Selector means having at least four positions may be envisaged in order to include the first position, the second position, the third position, and the fourth position, as mentioned above.

Furthermore, the power plant may include a selector member, e.g. provided with at least two positions each associated with a utilization envelope, said two positions being selected from a list comprising:

a fifth position for landing on a platform situated at a first height with a maximum weight that can be transported by the aircraft and requiring the engines to operate in accordance with a first utilization envelope;

a sixth position for landing on a platform situated at a second height, with a maximum weight transportable by the aircraft and requiring the engines to operate in accordance with a second utilization envelope;

a seventh position for landing on a takeoff zone having a first obstacle-free area and distinct from a platform, with a maximum weight transportable by the aircraft and requiring the engines to operate in accordance with a third utilization envelope; and an eighth position for landing on a takeoff zone having a second obstacle-free area and distinct from a platform, with a maximum weight transportable by the aircraft and requiring the engines to operate in accordance with a fourth utilization envelope.

Conversion from a takeoff envelope to a landing envelope may be performed automatically during a stage of cruising flight.

In addition to a power plant, the invention provides an aircraft provided with such a power plant, in particular a rotary wing aircraft and more particularly a rotorcraft of the helicopter type.

Furthermore, the invention also provides a method of piloting an aircraft provided with a power plant including at least one engine and control means for controlling said engine. The method comprises:

defining a list of utilization envelopes for the engine, the list comprising at least two distinct utilization envelopes each associated with the same number of maximum flying hours for the engine, each utilization envelope, having at least two utilization ratings, each defined for a developed power and for a utilization duration of the developed power;

storing the utilization envelopes in the control means; and prior to takeoff, selecting the envelope for use from the list as a function of the mission that is to be performed.

In addition, said power plant comprises two engines, and for each utilization envelope at least one contingency rating is defined suitable for use when one of said engines breaks down, a contingency rating of one envelope differing from a contingency rating of another envelope.

Furthermore, at least two envelopes may be stored comprising one envelope enabling takeoff to be optimized from a platform and another envelope enabling takeoff to be optimized from takeoff zones not including platforms.

For example, said power plant comprises two engines and said list includes at least two distinct utilization envelopes suitable for use over the same number of flying hours, said list comprising:

a first utilization envelope for taking off from a platform situated at a first height and with a maximum weight transportable by the aircraft;

a second utilization envelope for taking off from a platform situated at a second height and with a maximum weight transportable by the aircraft;

a third utilization envelope for taking off from a takeoff zone having a first obstacle-free area and distinct from a platform, with a maximum weight transportable by the aircraft; and a fourth utilization envelope for taking off from a takeoff zone having a second obstacle-free area and distinct from a platform, with a maximum weight transported by the aircraft.

BRIEF DESCRIPTION OF THE DRAWINGS

The invention and its advantages appear in greater detail from the following description of embodiments given by way of illustration with reference to the accompanying figures, in which.

Elements that are present in more than one of the figures are given the same references in each of them.

DETAILED DESCRIPTION OF THE PREFERRED EMBODIMENTS

Figure 1:
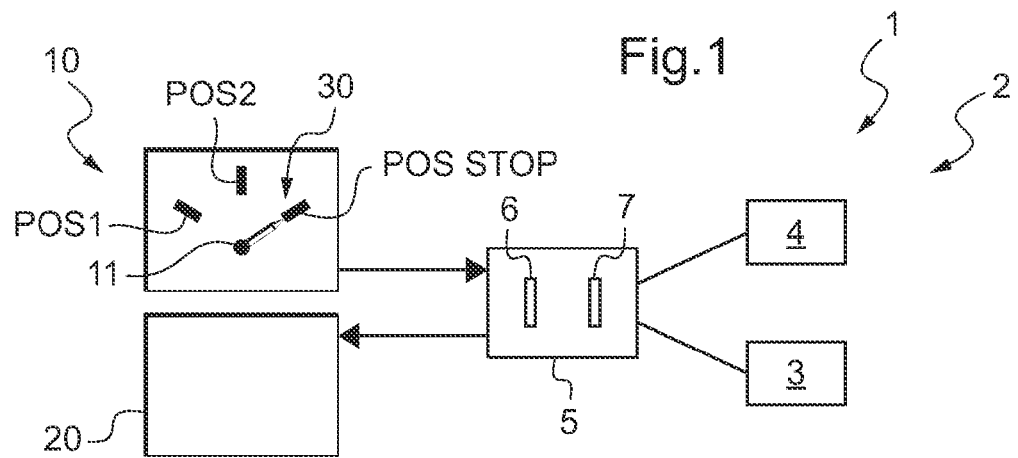
FIG. 1 is a diagram introducing an aircraft of the invention and explaining the method implemented.

FIG. 1 shows an aircraft 1 of the invention, the aircraft 1 being provided with a rotary wing, e.g. such as a helicopter.

The aircraft 1 includes a power plant 2 serving in particular to propel the aircraft, possibly by driving a rotary wing in rotation. The power plant is provided with at least one engine 3, 4, and specifically with two turbine engines in the example shown.

The power plant 2 possesses control means 5 for controlling the engines 3, 4. The control means 5 may comprise a single unit managing both engines or one unit per engine. Such control means are sometimes known under the acronym E.E.C.U.

The control means 5 then manage the engines 3, 4 so that they develop the power requested by the pilot.

The control means 5 thus comprise a processor 7 or the equivalent for managing the engines 3, 4, e.g. by controlling the rate at which fuel is fed to the engines.

According to the invention, a list of utilization envelopes is defined for the engines 3, 4. The list then comprises at least two distinct utilization envelopes associated with the same maximum number of flying hours, each utilization envelope comprising at least two utilization ratings, each defined by a developed power and a duration of utilization of said developed power.

In addition, the control means 5 include a memory 6, with the utilization envelopes being stored in the memory 6 of the control means 5, i.e. information is stored that will be needed by the control means in order to implement said utilization envelopes.

For example, each envelope comprises a takeoff rating defined by a maximum takeoff power (PMD) and a duration of utilization of said maximum takeoff power, and also a maximum continuous power (PMC) rating that is associated with said maximum continuous power rating being utilized for an unlimited duration.

In contrast, the value of the maximum takeoff power PMD and/or its duration of utilization may vary from one envelope to another. Similarly, the value of the maximum continuous power rating PMC may vary from one envelope to another.

With a twin-engined rotorcraft of the type shown, each utilization envelope may also encompass emergency contingency ratings that are used only when one engine is inoperative (OEI). In particular, each utilization envelope may comprise:

a first contingency rating defined by a supercontingency power and by a duration D1 of continuous utilization of this supercontingency power, and possibly also a maximum number of occasions on which this first contingency rating can be used in a given flight;

a second contingency rating defined by a maximum contingency power and by a utilization duration D2 for said maximum contingency power; and a third contingency rating defined by an intermediate contingency power and by an unlimited utilization duration D3 for said intermediate contingency power or the remainder of the flight after the failure of the turbine engine.

The values of the parameters for these contingency ratings may vary from one envelope to another.

Under such circumstances, before takeoff, the pilot selects the envelope that is to be used from the predefined list as a function of the mission that is to be carried out.

In addition, it can be understood that this list enables the manufacturer to have multiple options available. The manufacturer can thus optimize takeoff and landing procedures in order to optimize the weight that the envelope 1 can transport.

Furthermore, the power plant may be fitted with selector means 10 that communicate with the control means 5 in order to inform the control means 5 of the utilization envelope selected by the pilot.

The selector means 10 are provided with a rotary knob 11 or equivalent pilot-operable means. Depending on the position of the rotary knob 11, the control means determine the envelope that has been selected.

For example, the selector means have a first position POS1 and a second position POS2 for requesting implementation respectively of a first utilization envelope and of a second utilization envelope, making it possible respectively to optimize takeoff from a platform and to optimize takeoff from a takeoff zone, not including a platform.

Furthermore, it is possible to provide the power plant 2 with safety means 30 for guaranteeing that the pilot selects a utilization envelope prior to takeoff.

The safety means 30 may comprise a stop position POSSTOP for the selector means 10. When stopped, the rotary knob 11 of the selector means takes up this stop position POSSTOP. The control means may then optionally prevent the engines 3, 4 from starting until the pilot has selected a utilization envelope by operating the rotary knob 11.

Furthermore, the power plant 2 described includes display means 20 that co-operate with the control means 5. The control means 5 inform the display means of the selected utilization envelope and of the utilization rating of the selected utilization envelope, with this taking place in real time.

Under such circumstances, the display means may display either the utilization envelope that is in use, or else the utilization rating being implemented by the power plant 2, or else the utilization envelope and the utilization rating of said utilization envelope that are being implemented by the power plant 2.

Furthermore, making a plurality of utilization envelopes available to the pilot enables provision to be made for takeoff procedures that require distinct ratings as a function of the nature of the takeoff area.

Figure 2:
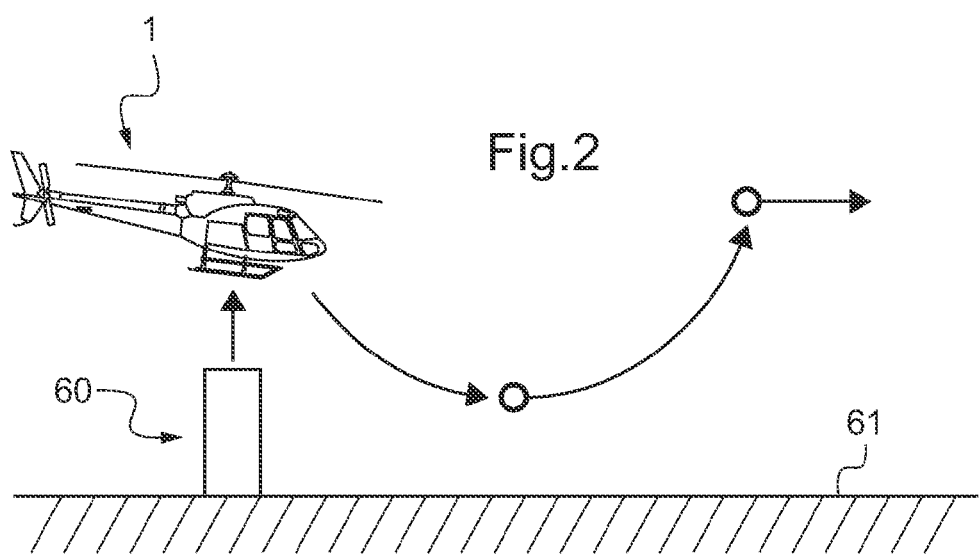
FIG. 2 is a diagram explaining a stage of taking off from a platform.
Figure 3:
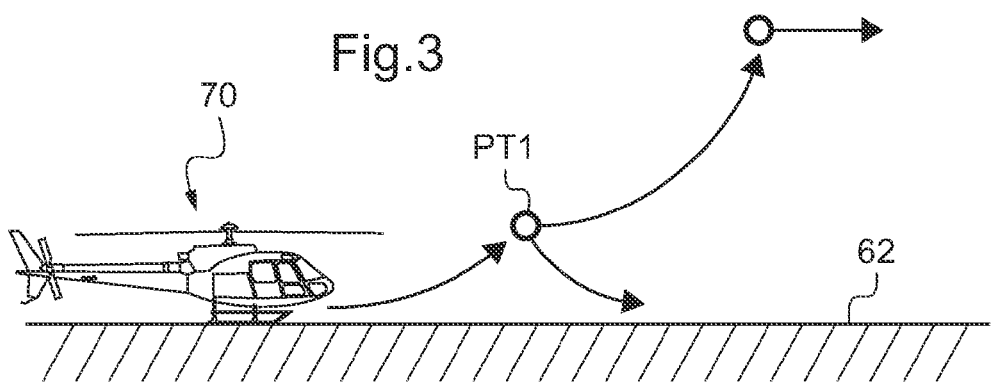
FIG. 3 is a diagram explaining a stage of taking off from land.

With reference to FIGS. 2 and 3, it is possible to optimize the weight that the envelope 1 can carry by implementing the invention independently of the nature of the takeoff area.

For example, the aircraft 1 shown has a power plant including at least two utilization envelopes, a first utilization envelope giving priority to a high supercontingency power and a second envelope giving priority to a high maximum contingency power.

FIG. 2 explains a takeoff procedure for a rotorcraft 1, i.e. a rotary wing aircraft taking off from a platform type takeoff area 60 arranged above a surface such as the sea, for example. The term "height" is used to mean the distance between said surface 61 and the platform takeoff area.

The pilot of the twin-engined rotorcraft 1 then selects the first-described envelope and takes off vertically from the platform.

If an engine of the rotorcraft 1 breaks down, then the pilot uses the high supercontingency power in order to control the drop of the rotorcraft 1 towards the sea, and then implements the intermediate contingency power in order to climb back up and continue the flight. It should be observed that the second envelope does not make such a procedure possible, or at least not when transporting a relatively large weight.

Conversely, FIG. 3 shows a takeoff procedure for a rotorcraft 1, i.e. a rotary wing aircraft, from a takeoff zone 70, this takeoff zone 70 not being a platform.

The pilot of the twin-engined rotorcraft 1 then selects the second above-described envelope and takes off with a positive forward speed from the takeoff zone 70.

If an engine of the rotorcraft 1 breaks down at a point PT1, the pilot can either land on the ground 62 or else use the high maximum contingency power in order to continue the flight. It should be observed that the first envelope does not enable such a procedure to be performed, or at least not when transporting a relatively large weight.

In a variant explained with reference to FIGS. 4 to 7, the list of utilization envelopes may comprise at least four envelopes, namely:

- a first utilization envelope corresponding to a first position OEI1 of the selector means 10 for taking off from a platform 60 situated at a first height of 50 feet (ft) (i.e. 15.24 meters (m)), for example, with a maximum weight that can be transported by the aircraft 1;
- a second utilization envelope corresponding to a second position OEI2 of the selector means 10, for taking off from a platform 60 situated at a second height, greater than the first height, i.e. 100 ft (i.e. 30.48 m) for example, with a maximum weight that can be transported by the aircraft 1;
- a third utilization envelope corresponding to a third position OEI3 of the selector means 10, for taking off from a takeoff zone 70 having a first obstacle-free area ahead of the aircraft, with a length of 25 m, for example, and distinct from a platform 60, with a maximum weight that can be transported by the aircraft 1; and
- a fourth utilization envelope corresponding to a fourth position OEI4 of the selector means 10, for taking off from a takeoff zone 70 having a second obstacle-free area ahead of the aircraft, with a length of 100 m, for example, and distinct from a platform 60, with a maximum weight that can be transported by the aircraft 1.

The first and second envelopes relate to taking off from a platform, the while the third and fourth envelopes relate to taking off from an obstacle-free area that is distinct from a platform.

Each envelope then possesses a first contingency rating during which an engine may develop a supercontingency power for a first given length of time, a second contingency rating during which an engine may develop a maximum contingency power during a second given length of time, and a third contingency rating during which an engine may develop an intermediate contingency power continuously, these contingency ratings being implemented when one of the engines is inoperative.

Figure 4:
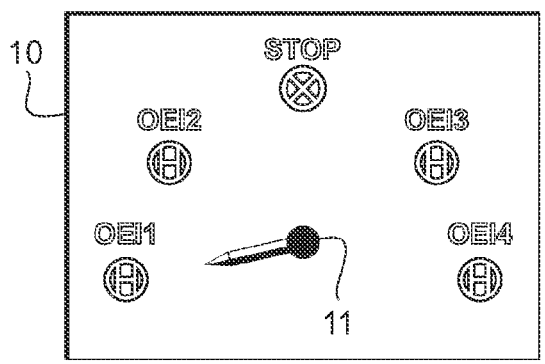
FIGS. 4 to 7 are diagrams explaining a variant of the invention.
Figure 4:
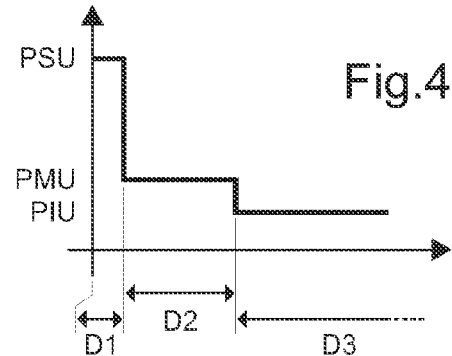

With reference to FIG. 4, for the first envelope, the supercontingency power PSU reaches a high supercontingency value, e.g. about 1100 kW, the maximum contingency power PMU reaches a limited maximum contingency value, e.g. of the order of 600 kW, while the intermediate contingency power PIU is equal to a limited intermediate contingency value, e.g. of the order of 450 kW.

The staging of the contingency powers that are developed in this first envelope gives priority to the supercontingency power to the detriment of the other contingency powers in order to maximize the weight that can be transported when taking off from a platform while using the above-described procedure.

Figure 5:
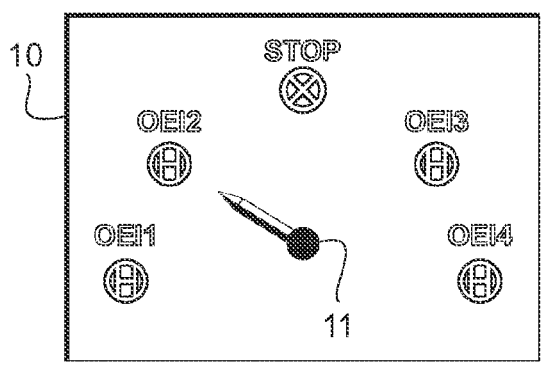
Figure 5:
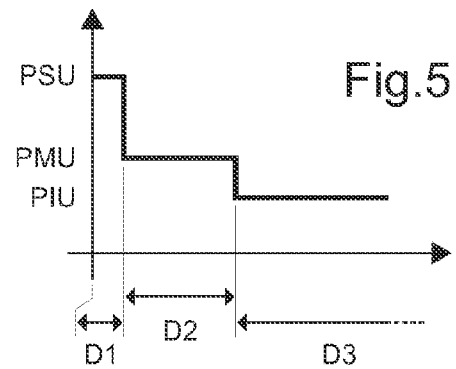

With reference to FIG. 5, for the second utilization envelope, the supercontingency power reaches a medium supercontingency value, e.g. of the order of 1000 kW, the maximum contingency power reaches a high maximum contingency value, e.g. of the order of 700 kW, while the intermediate contingency power is equal to a first medium intermediate contingency value, e.g. of the order of 500 kW.

This second envelope enables a given transportable weight to be achieved that is not negligible. Compared with the first envelope, the second envelope provides a maximum contingency power that is greater.

Thus, depending on the weight that is to be transported and on the height of the platform, a pilot selects either the first envelope or the second envelope.

Figure 6:
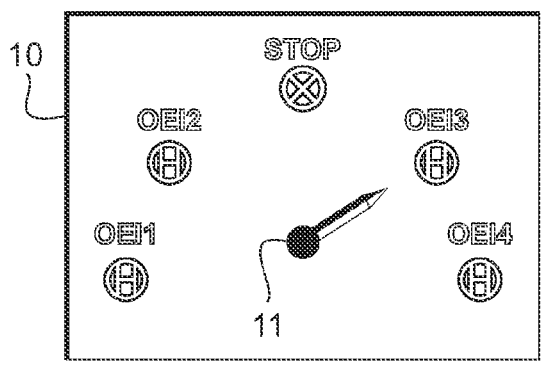
Figure 6:
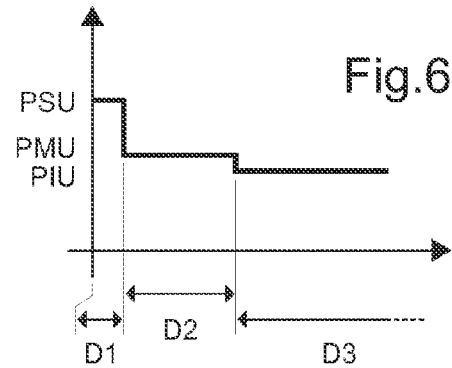

With reference to FIG. 6, for the third utilization envelope, the supercontingency power reaches a second medium supercontingency value, e.g. of the order of 900 kW, the maximum contingency power reaches a second high maximum contingency value, e.g. of the order of 650 kW, while the intermediate contingency power is equal to a high intermediate contingency value, e.g. of the order of 600 kW.

This third envelope is adapted to taking off from a takeoff zone 70 having a first obstacle-free area, e.g. with a length of 25 m. The presence of a maximum contingency power enables a mission to be carried out after a breakdown of one engine with a maximized transportable weight.

Figure 7:
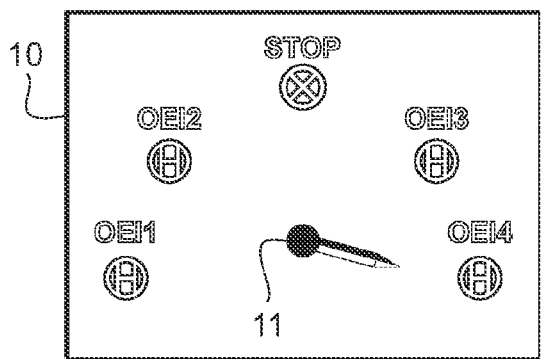
Figure 7:
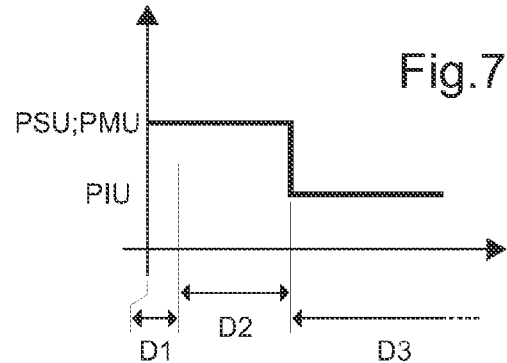

With reference to FIG. 7, for a fourth utilization envelope, the supercontingency power reaches a limited supercontingency value, e.g. of the order of 800 kW, the maximum contingency power reaches a high maximum contingency value, e.g. of the order of 800 kW, while the intermediate contingency power is equal to a medium intermediate contingency value, e.g. of the order of 500 kW.

This fourth envelope is adapted to taking off from a takeoff zone 70 having a second obstacle-free area, e.g. with a length of 100 m, and with a maximized transportable weight.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A power plant having at least one engine and control means for controlling the engine, wherein the control means include a memory, the memory containing information enabling the engine to be operated in accordance with at least two distinct utilization envelopes during a maximum number of flying hours, each utilization envelope including at least two distinct utilization ratings each defined by a developed power and a utilization duration for the developed power, the at least two envelopes comprising an envelope that enables takeoff to be optimized from a platform and another envelope that enables takeoff to be optimized from takeoff zones that do not include platforms.

2. The power plant according to claim 1, including pilot-operable selector means, the selector means being connected to the control means to enable a pilot to select a utilization envelope in accordance with which of the engines is to operate.

3. The power plant according to claim 2, wherein the power plant comprises two engines of an aircraft, the selector means include at least two positions each associated with a respective utilization envelope, the two positions being for selection from a list including:

a first position for taking off from a platform situated at a first height with a maximum weight that can be transported by the aircraft and requiring the engines to operate in accordance with a first utilization envelope;

a second position for taking off from a platform situated at a second height, with a maximum weight transportable by the aircraft and requiring the engines to operate in accordance with a second utilization envelope;

a third position for taking off from a takeoff zone having a first obstacle-free area and distinct from a platform, with a maximum weight transportable by the aircraft and requiring the engines to operate in accordance with a third utilization envelope; and a fourth position for taking off from a takeoff zone having a second obstacle-free area and distinct from a platform, with a maximum weight transportable by the aircraft and requiring the engines to operate in accordance with a fourth utilization envelope.

4. The power plant according to claim 1, including safety means for ensuring that an envelope is deliberately selected before beginning a flight.

5. The power plant according to claim 1, wherein the power plant includes display means displaying either the utilization envelopes, or the utilization ratings implemented by the power plant, or the utilization envelopes and the utilization ratings of the utilization envelopes that are being implemented by the power plant.

6. The power plant according to claim 1, wherein the power plant has two engines, each utilization envelope including at least one contingency rating suitable for use when one of the engines breaks down, with a contingency rating of one envelope differing from a contingency rating of another envelope.

7. An aircraft, including the power plant according to claim 1.

8. A method of piloting an aircraft provided with a power plant including at least one engine and control means for controlling the engine, the method comprising:

defining a list of utilization envelopes for the engine, the list comprising at least two distinct utilization envelopes, each associated with the same number of maximum flying hours for the engine, each utilization envelope having at least two utilization ratings, each defined for a developed power and for a utilization duration of the developed power;

storing the utilization envelopes in the control means; and prior to takeoff, selecting an envelope for use from the list as a function of the mission that is to be performed, wherein the at least two envelopes comprise an envelope enabling takeoff to be optimized from a platform and another envelope enabling takeoff to be optimized from takeoff zones not including platforms.

9. The method according to claim 8, wherein the power plant comprises two engines, and for each utilization envelope at least one contingency rating is defined suitable for use when one of the engines breaks down, a contingency rating of one envelope differing from a contingency rating of another envelope.

10. The method according to claim 8, wherein the power plant comprises two engines and the list includes at least two distinct utilization envelopes suitable for use over the same number of flying hours, the list comprising:

a first utilization envelope for taking off from a platform situated at a first height and with a maximum weight transportable by the aircraft;

a second utilization envelope for taking off from a platform situated at a second height and with a maximum weight transportable by the aircraft;

a third utilization envelope for taking off from a takeoff zone having a first obstacle-free area and distinct from a platform, with a maximum weight transportable by the aircraft; and a fourth utilization envelope for taking off from a takeoff zone having a second obstacle-free area and distinct from a platform, with a maximum weight transported by the aircraft.

11. A power plant having at least one engine and a control for controlling the engine, the control including a memory containing information enabling the engine to be operated in accordance with at least two distinct utilization envelopes during a maximum number of flying hours, with each utilization envelope including at least two distinct utilization ratings each defined by a developed power and a utilization duration for the developed power, the at least two envelopes comprising a first envelope that enables takeoff to be optimized from a platform and a second envelope that enables takeoff to be optimized from takeoff zones that do not include platforms.

12. The power plant according to claim 11, including pilot-operable selector connected to the control to enable a pilot to select one of the utilization envelopes.

13. The power plant according to claim 12, wherein the power plant comprises two engines of an aircraft, the selector includes at least two positions each associated with a respective utilization envelope, the two positions being for selection from a list including:
    a first position requiring the engines to operate in accordance with a first utilization envelope;
    a second position requiring the engines to operate in accordance with a second utilization envelope;
    a third position requiring the engines to operate in accordance with a third utilization envelope; and
    a fourth position requiring the engines to operate in accordance with a fourth utilization envelope.

14. The power plant according to claim 12, wherein the power plant comprises two engines of an aircraft, the selector includes at least two positions each associated with a respective utilization envelope, the at least two positions being for selection from a list including:
    a first position for taking off from a platform situated at a first height with a maximum weight that can be transported by the aircraft and requiring the engines to operate in accordance with a first utilization envelope;
    a second position for taking off from a platform situated at a second height, with a maximum weight transportable by the aircraft and requiring the engines to operate in accordance with a second utilization envelope;
    a third position for taking off from a takeoff zone having a first obstacle-free area and distinct from a platform, with a maximum weight transportable by the aircraft and requiring the engines to operate in accordance with a third utilization envelope; and
    a fourth position for taking off from a takeoff zone having a second obstacle-free area and distinct from a platform, with a maximum weight transportable by the aircraft and requiring the engines to operate in accordance with a fourth utilization envelope.

15. The power plant according to claim 11, including a safety component for ensuring that one of the envelopes is deliberately selected before beginning a flight.

16. The power plant according to claim 11, wherein the power plant includes a display capable of displaying either the utilization envelopes, or the utilization ratings implemented by the power plant, or the utilization envelopes and the utilization ratings of the utilization envelopes that are being implemented by the power plant.

17. The power plant according to claim 11, wherein the power plant has two engines, each utilization envelope including at least one contingency rating suitable for use when one of the engines breaks down, with a contingency rating of one envelope differing from a contingency rating of another envelope.

18. An aircraft, including the power plant according to claim 11.

* * * * *